United States Patent
Distelrath

(10) Patent No.: US 9,260,047 B2
(45) Date of Patent: Feb. 16, 2016

(54) HORSE STALL CONVERSION KIT FOR ENCLOSED TRAILER

(71) Applicant: Anthony J. Distelrath, China, MI (US)

(72) Inventor: Anthony J. Distelrath, China, MI (US)

(73) Assignee: Left Wing Investments LLC, Marysville, MI (US)

( * ) Notice: Subject to any disclaimer, the term of this patent is extended or adjusted under 35 U.S.C. 154(b) by 0 days.

(21) Appl. No.: 14/455,474

(22) Filed: Aug. 8, 2014

(65) Prior Publication Data

US 2015/0042119 A1    Feb. 12, 2015

Related U.S. Application Data

(60) Provisional application No. 61/863,737, filed on Aug. 8, 2013.

(51) Int. Cl.
- B62D 33/04    (2006.01)
- B60P 3/04    (2006.01)

(52) U.S. Cl.
CPC ........................................ B60P 3/04 (2013.01)

(58) Field of Classification Search
CPC ............................................................ B60P 3/04
See application file for complete search history.

(56) References Cited

U.S. PATENT DOCUMENTS

| | | | | |
|---|---|---|---|---|
| 2,165,937 A * | 7/1939 | Nancarrow | A63K 3/026 | 119/423 |
| 3,741,529 A * | 6/1973 | Blagg | B60P 3/04 | 119/512 |
| 3,744,456 A * | 7/1973 | Wheeler | A01K 1/0236 | 119/513 |
| 4,095,561 A * | 6/1978 | Ruetenik | A01K 15/027 | 119/700 |
| 4,355,594 A * | 10/1982 | Wagner | B60P 3/04 | 119/400 |
| 4,468,061 A * | 8/1984 | Blake | B60P 3/04 | 119/412 |
| 4,530,538 A * | 7/1985 | Greene, Jr. | B60P 3/04 | 119/412 |
| 5,513,595 A * | 5/1996 | Chatterton | B60P 7/15 | 119/412 |
| 6,698,812 B1 * | 3/2004 | Stubbs | B60P 3/04 | 119/400 |
| 7,246,572 B1 * | 7/2007 | Wade | A01K 1/0209 | 119/416 |
| 8,443,759 B2 * | 5/2013 | Nagely | A61D 3/00 | 119/416 |
| 2005/0279031 A1 * | 12/2005 | Vincent | A01K 1/0094 | 52/35 |
| 2006/0267352 A1 * | 11/2006 | Childress | E05B 65/0007 | 292/246 |
| 2007/0028850 A1 * | 2/2007 | Blazek | B60P 3/04 | 119/411 |
| 2008/0122238 A1 * | 5/2008 | Fulmer | B60P 3/04 | 296/24.31 |
| 2009/0232760 A1 * | 9/2009 | McArthur | A01K 1/0152 | 424/76.1 |
| 2011/0315088 A1 * | 12/2011 | Yoder | A01K 1/0155 | 119/526 |

* cited by examiner

*Primary Examiner* — Lori L Lyjak

(74) *Attorney, Agent, or Firm* — Young, Basile, Hanlon & MacFarlane PC

(57) ABSTRACT

A conversion kit for an enclosed trailer forms at least one animal stall in a storage compartment of the trailer. The conversion kit includes separable vertical stanchions and stall dividers which are removably mountable in the trailer storage compartment to form one or more stalls. A breastplate, a front wall and a feed tray may be mounted at a front end of the stall dividers. A manger door opens to a storage compartment below the feed tray. A saddle hanger may be mounted at a forward end of the front wall. Openable rear doors close one end of the stalls.

23 Claims, 16 Drawing Sheets

HORSE STALL CONVERSION KIT FOR ENCLOSED TRAILER

CROSS REFERENCE TO CO-PENDING APPLICATION

This application claims priority benefit to the Aug. 8, 2013 filing date of U.S. provisional patent application Ser. No. 61/863,737, for HORSE STALL CONVERSION KIT FOR ENCLOSED TRAILER, filed in the name of Anthony Distelrath, the contents of which are incorporated herein in its entirety.

BACKGROUND

The present disclosure relates to travel trailers and, more particularly travel with closed cargo storage compartments.

Travel trailers have been developed with a separate enclosed storage area and a moveable ramp behind a separate passenger compartment. Such modified trailers are called "toy haulers" or "toy boxes" due to the "adult toys" which can be stored in the enclosed storage area, such as ATV, golf carts, motorcycles, etc.

Horse trailers represent a different type of travel trailer and are designed to carry one or more horses in safe comfort. However, horse trailers typically are multiples in costs of toy haulers or toy box trailers due to their specialized construction for transporting horses.

It would be desirable to provide means for converting the storage compartment of a toy hauler or toy box trailer for transporting horses.

SUMMARY

A conversion kit for an enclosed cargo storage compartment of a trailer defined by a floor, sidewalls, a front wall, an openable rear wall, and a ceiling, includes stanchions removably mounted to the floor of the trailer, at least two dividers releasibly affixed to the stanchions, and a breastplate removably mounted between the stanchions and forming, in conjunction with the dividers, a stall open to the rear wall of the trailer. A front wall spans two of the stanchions forward of the dividers. Upper panels are mounted between the front wall and each of the two stanchions and rear spaced stanchions.

The conversion kit can include a frame removably fixed to the floor storage compartment, bores in the frame, and a releasable lock cooperating between the stanchion and one bore in the frame for removably affixing the stanchion to the frame.

The conversion kit can include a front wall removably coupled to the stanchions.

The conversion kit can include a tray removably mounted between the breastplate and the front wall at one end of the stall.

The conversion kit can include a lower manger panel coupled between the stanchions and located at one end of the dividers to span at least two of the dividers. The lower manger panels can be pivotally coupled to the stanchions to enable the lower manger panel to be pivoted between a first position extending across two of the dividers and a second position wherein one end of the lower manger panel is spaced from the stanchions.

The conversion kit can include an upper divider brace mounted on one or all of the dividers.

The conversion kit can include a protective mat fixed to an inner surface of the rear wall of the trailer. The rear wall of the trailer acts as a ramp to an open end of the at least one stall when the rear wall is pivoted to a downward extending position.

The conversion kit can include a wedge mounted on a rear inclined end of the floor. The wedge has an upper surface forming a continuous level upper surface with a remainder of the floor in the cargo area.

The conversion kit can include three divider panels, and two rear gates pivotally mounted adjacent the open ends of two stalls formed by the spaced three dividers.

The conversion kit includes one of the three dividers removably mounted adjacent one of the side walls of the trailer, and another one of the three dividers mounted in the cargo area of the trailer spaced from the opposed sidewall of the trailer to define a passageway between the another one divider and the opposite sidewall of the trailer.

In another aspect, a trailer defined by a floor, sidewalls, front wall, an openable rear wall, and a ceiling includes stanchions mounted to the floor of the trailer, at least two dividers affixed to the stanchions, and a breastplate mounted between the stanchions and forming, in conjunction with the dividers, a stall open to the rear wall of the trailer. A front wall spans two of the stanchions forward of the dividers. Upper panels are mounted between the front wall and each of the two stanchions and rear spaced stanchions.

BRIEF DESCRIPTION OF THE DRAWING

The various features, advantages and other uses of the present horse stall conversion kit for an enclosed trailer will become more apparent by referring to the following detailed description and drawing in which.

DETAILED DESCRIPTION

Figure 1:
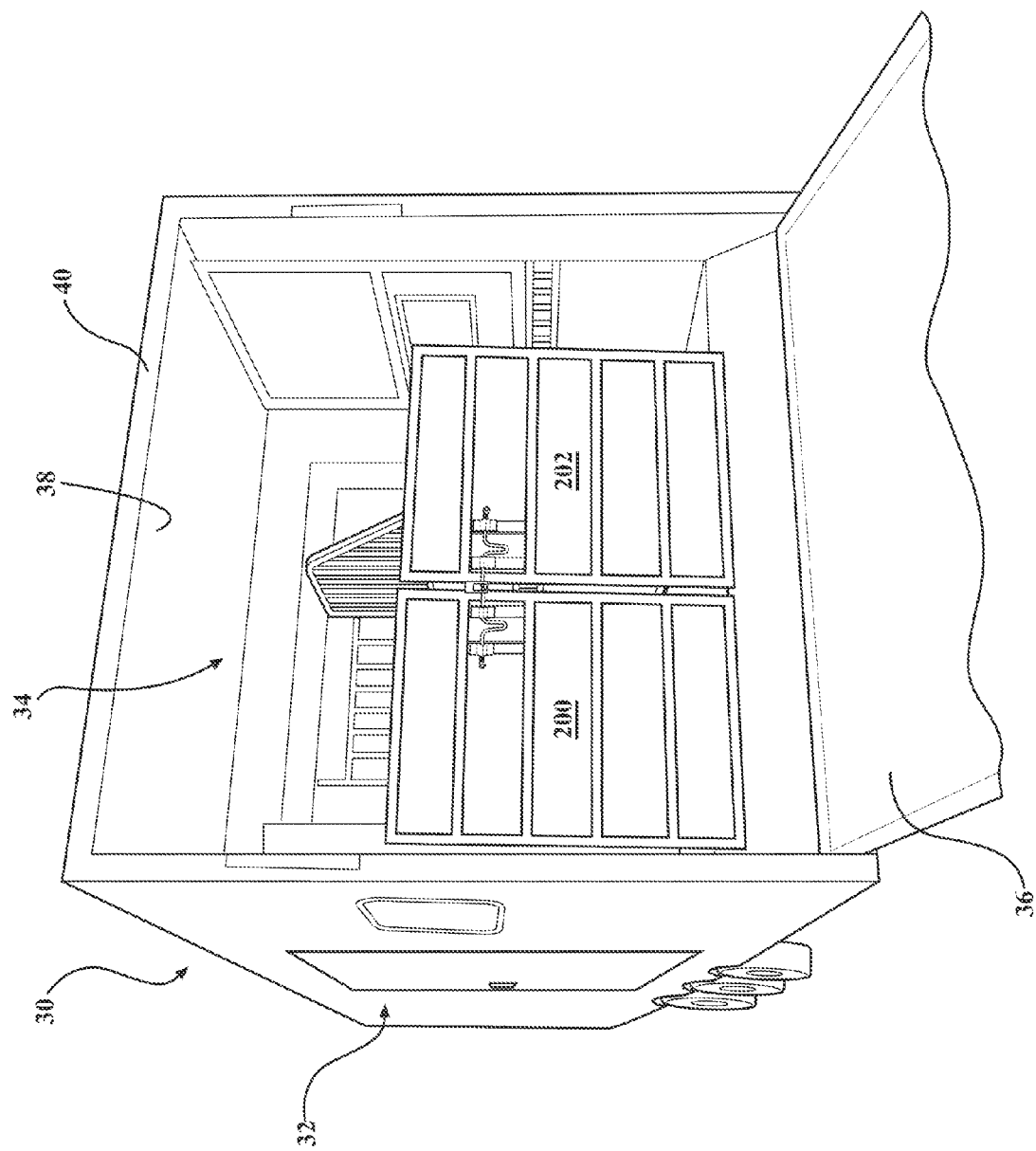
FIG. 1 is a rear perspective view of a trailer incorporating the horse stall conversion kit.

FIG. 1 depicts a vehicle, referred to as a "toy hauler" or "toy box trailer 30", which is manufactured and sold by Jayco, Daytona, Forest River, Eclipse, Magnum, Keystone, Heartland, and others. By example and throughout the following description, a Recon toy box trailer sold by Jayco is shown and described. It will be understood that this particular toy box trailer is used only as an example, as the present conversion kit can be employed, as is, or with only minor modification, in practically any toy hauler or toy box trailer, or any trailer which has an enclosed storage area, with or without an adjacent passenger compartment.

The trailer 30 includes a forward located passenger living compartment 32 and a rearward located, enclosed storage compartment 34. A pivotal ramp 36 is attached to a rear lower portion of the trailer 30 and is designed not only to close an opening 38 on a rear wall 40 of the trailer 30, but also, when pivoted to the lower position shown in FIG. 1, to serve as a ramp for loading and offloading horses or other articles, such as vehicles, including golf carts, ATVs, motorcycles, etc.

Figure 2:
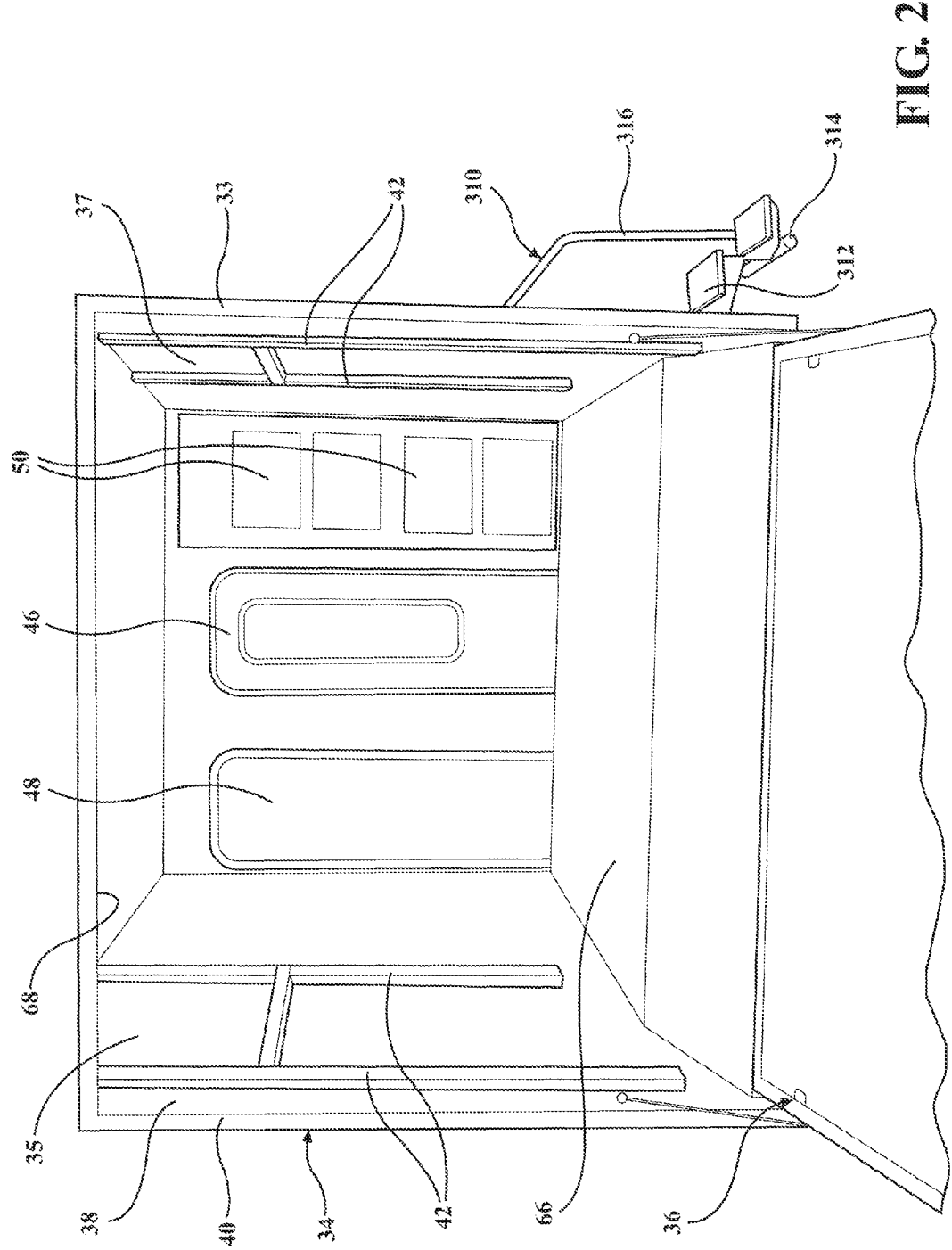
FIG. 2 is a rear perspective view showing the trailer depicted in FIG. 1 prior to the installation of the conversion kit.

As shown in FIG. 2, for the particular Recon Jayco toy hauler used as an example of the trailer 30 in the present description, a view of the interior of the trailer 30 shows a pair of rails 42 mounted on the interior sidewalls of the storage compartment 34. The rails 42 act as guides for a lowerable and raiseable bed. In the particular example shown in FIG. 2, a pair of separate bunk beds are selectably lowerable from an upper portion of the rear storage compartment 34 to a lower position. The lower bunk bed is convertible into a couch.

Also shown in FIG. 2 are an entry door 46 to the forward passenger compartment 32, a door 48 opening to a bathroom accessible from the interior of the storage compartment 34, and a pair of pivotable doors 50, which are openable to an interior storage area within the storage compartment 34. An interior water source can be provided within the storage compartment 34 behind the doors 50.

The present conversion kit converts the open storage compartment 34 of the trailer 30 to a horse trailer. The conversion kit is easily installed and can be quickly and easily removed from the storage compartment 34 to permit the storage compartment 34 to be used for other purposes when not transporting horses.

The conversion kit includes a number of components shown in FIGS. 3-21 which are assembled in position within the interior of the storage compartment 34 and form one or more stalls for individually receiving one or more horses.

Figure 4:
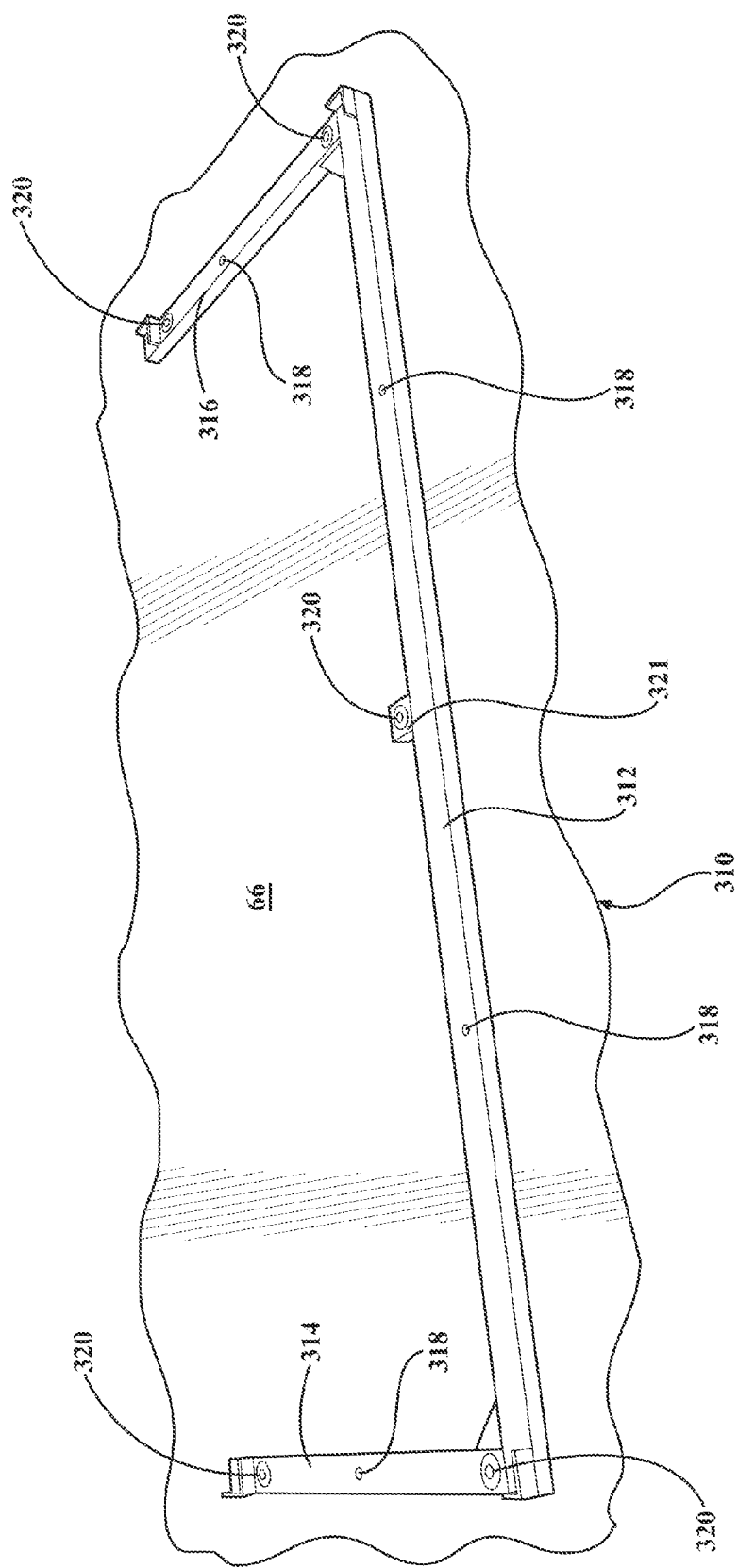
FIG. 4 is a perspective view of the stanchion mounting frame.
Figure 5:
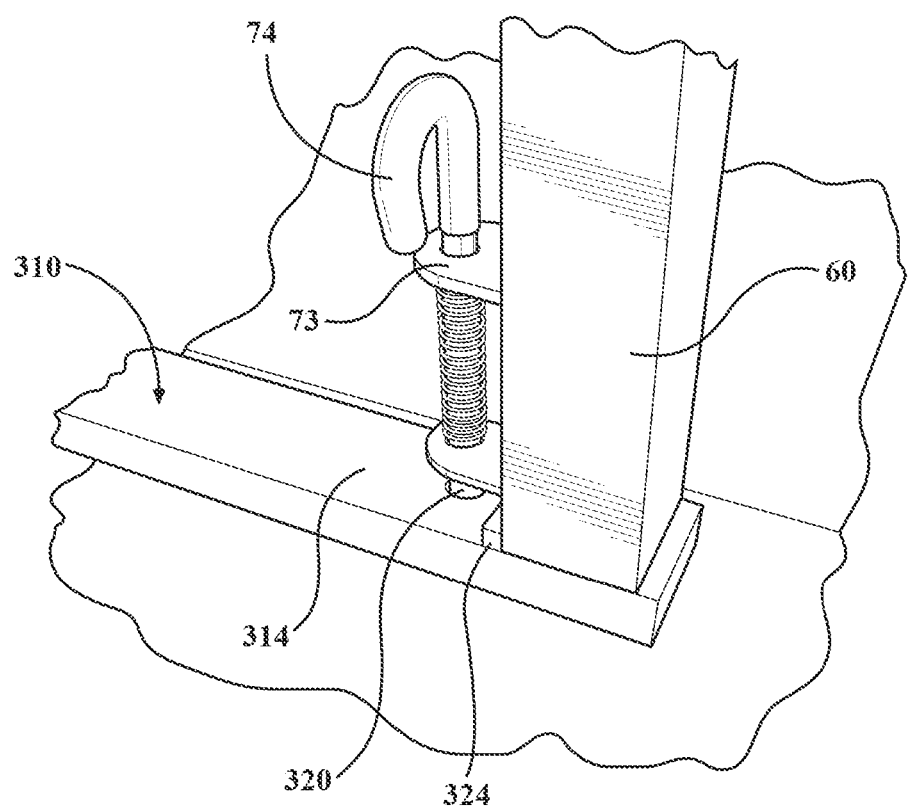
FIG. 5 is an enlarged, perspective view of the stanchion to frame locking mechanism.

A frame 310 shown in FIGS. 4 and 5 is formed of three end connected legs, including a longer central leg 312 and two shorter side legs 314 and 316. Pins 318 are fixedly mounted in the legs 312, 314 and 316 and have a lower portion extending outward beyond the lower surface of each leg 312, 314, and 316 to seat within bores formed in a storage compartment floor 66. The pins 318 locate the frame 310 in position on the floor 66.

As shown in FIG. 5A, bores 320 are formed in the four corners of the frame 310 as well as in a front center pad 324. The bores 320 receive lock pins, as described hereafter, which releasibly mount the lower ends of stanchions 60 in the bores 320 in the frame 310.

Figure 3:
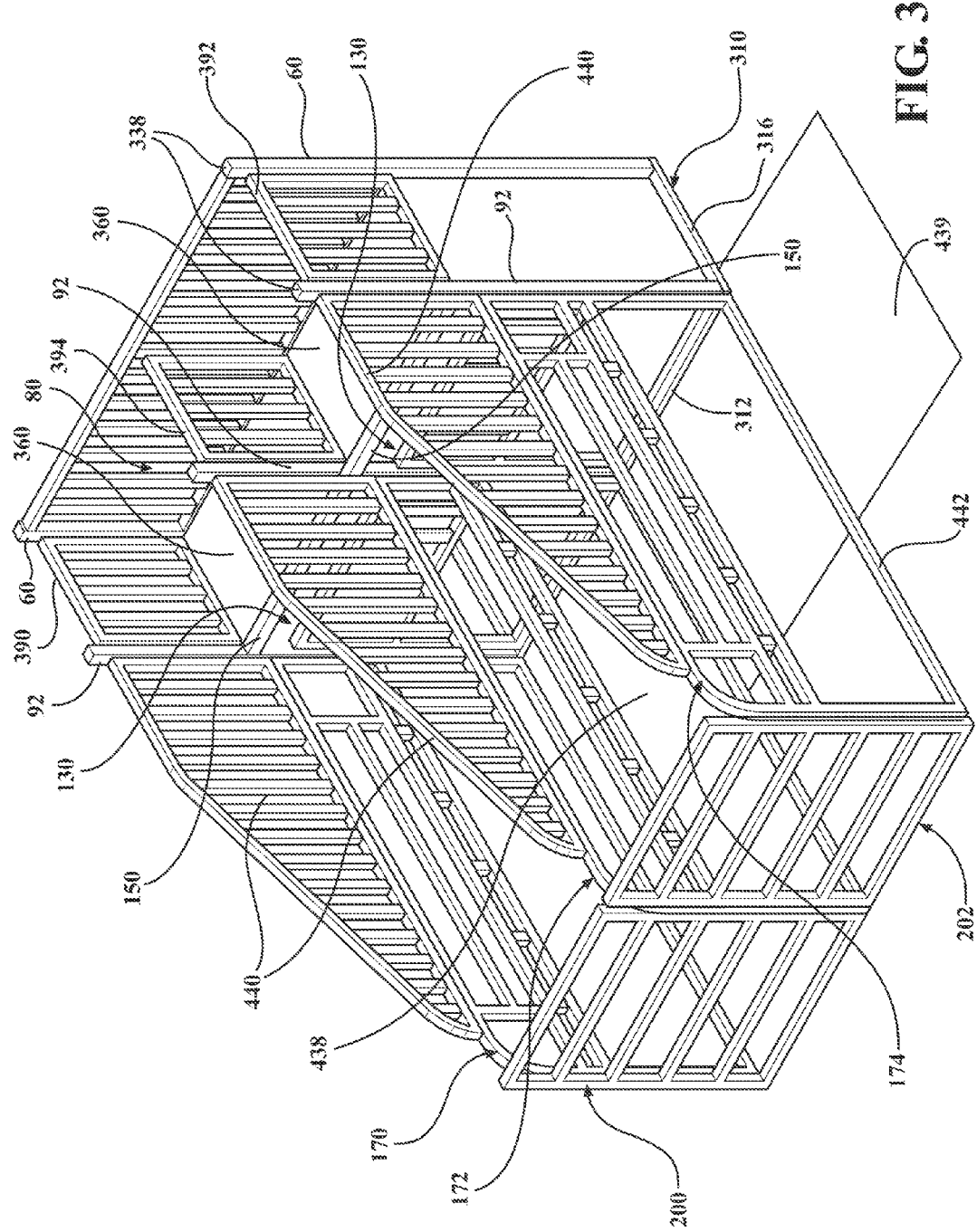
FIG. 3 is a perspective view of the elements of the conversion kit in an assembled position.

By way of example, and as shown in FIG. 3, a pair of front stanchions 60 are removably mounted in the frame 310 within the interior of the storage compartment 34 and extend between the floor 66 and the ceiling 68 of the storage compartment 34. The stanchions 60, by way of example only, are in the form of square tubular members. It will be understood that other shapes, such as round, rectangular, etc., shaped members may also be used to form the stanchions 60.

The lower end of each stanchion 60 has clevis 73, FIG. 5, with two spaced, coaxial apertures which receive a spring loaded J-pin 74. The J-pin 74 or actuator is vertically movable by the user between a lower position, shown in FIG. 5, in which the lower end of the end of the J-pin 74 extends, into one of the bores 320 in the frame 310 and a second, release position in which the end of the spin 74 is retracted from the bore 320 to allow disengagement of the stanchion 60 from the frame 310.

As shown in FIG. 5, at least one mounting boss 325 may be welded to the frame 310 to form a seat accurately defining the proper position of a lower end of the stanchion 60 on the frame 310.

The stanchions 60 and 92 may have upper ends spaced from the ceiling 38 of the storage compartment 34. Alternately, the upper ends of the stanchions 60 and 92 may be fixed in suitable mounting brackets removably attached to the ceiling 38 of the storage compartment 34.

Figures 9, 10:
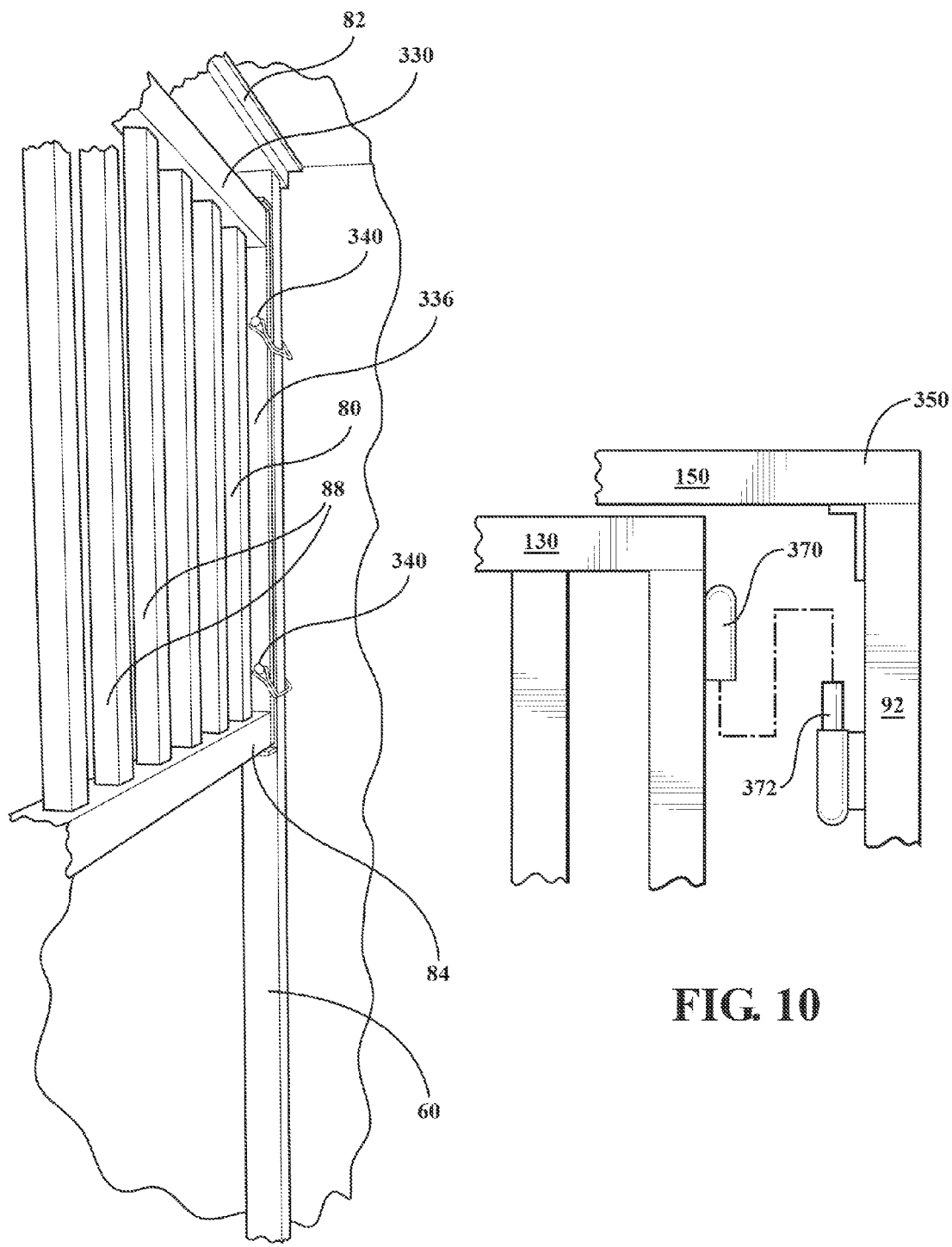
FIG. 9 is a partial perspective view showing a front corner portion of the conversion kit depicted in FIG. 3.
FIG. 10 is an enlarged, partial, elevational view showing the hinged connection of the front manger door to a front stanchion.
Figure 20:
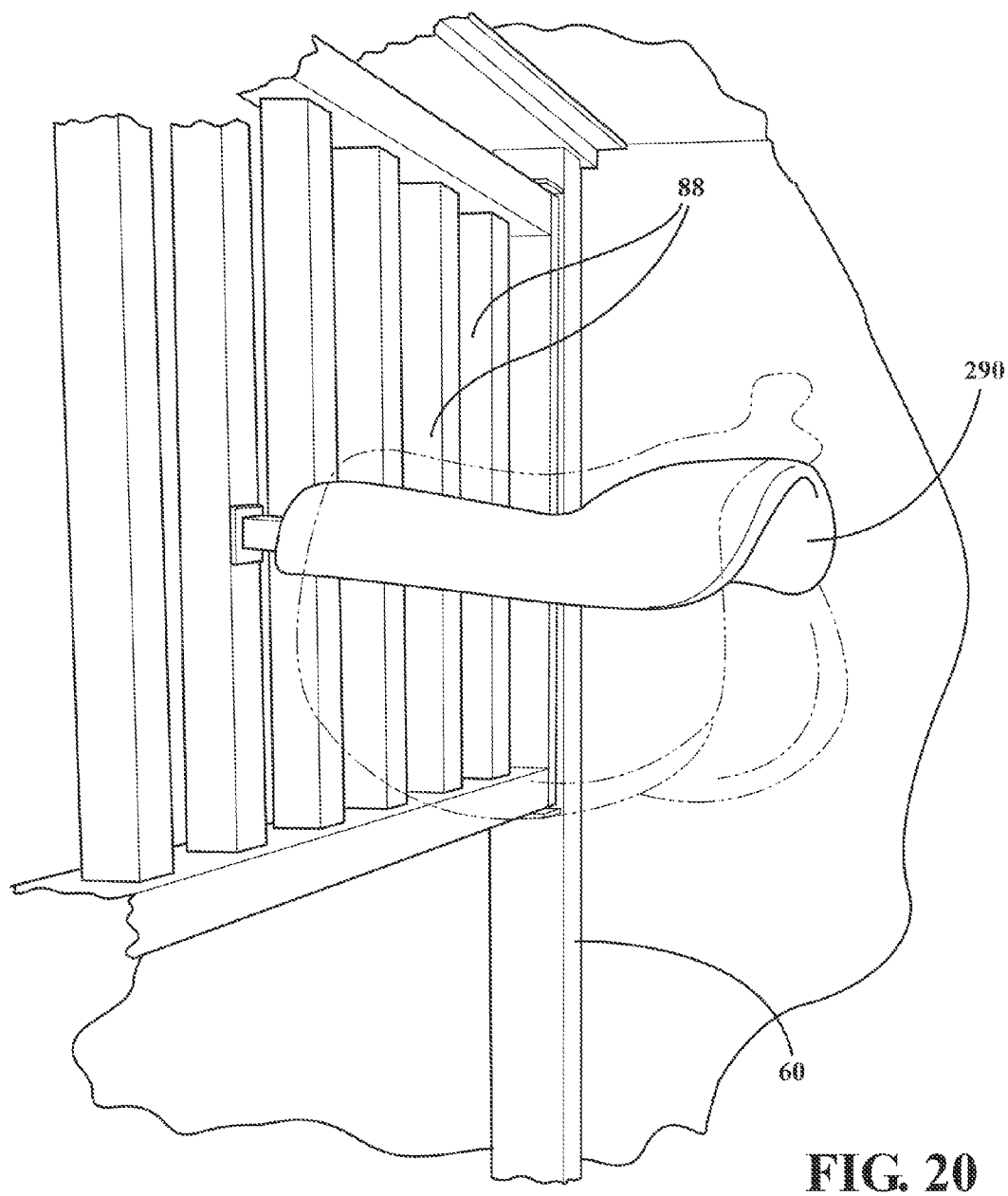
FIG. 20 is a perspective view of the front end of the conversion kit mounted in the trailer and showing an optional saddle hanger.

A front wall 80, partially shown in FIGS. 3, 9, and 20 is releasibly attached to the stanchions 60, such as by pull pin fasteners 340, etc. The front wall 80 includes a horizontally extending tubular upper bar 82 and a tubular lower bar 84 forming a polygonal metal frame including the upper bar 82, the parallel spaced lower bar 84, and a pair of side legs 336 which are welded together and support individual spaced bars 88. As shown in FIG. 10, the front wall 80 is mounted on an upper portion of the spaced front stanchions 90 by the fasteners 340.

Three rear stanchions 92, shown in FIG. 3 are also removably mounted in the floor 66 of the storage compartment 34. The stanchions 92 have a tubular shape, by example. The lower ends of the rear stanchions 92 are releasibly locked in the bores in the frame 310 by the J-pins 74 shown in FIG. 5.

Figure 11:
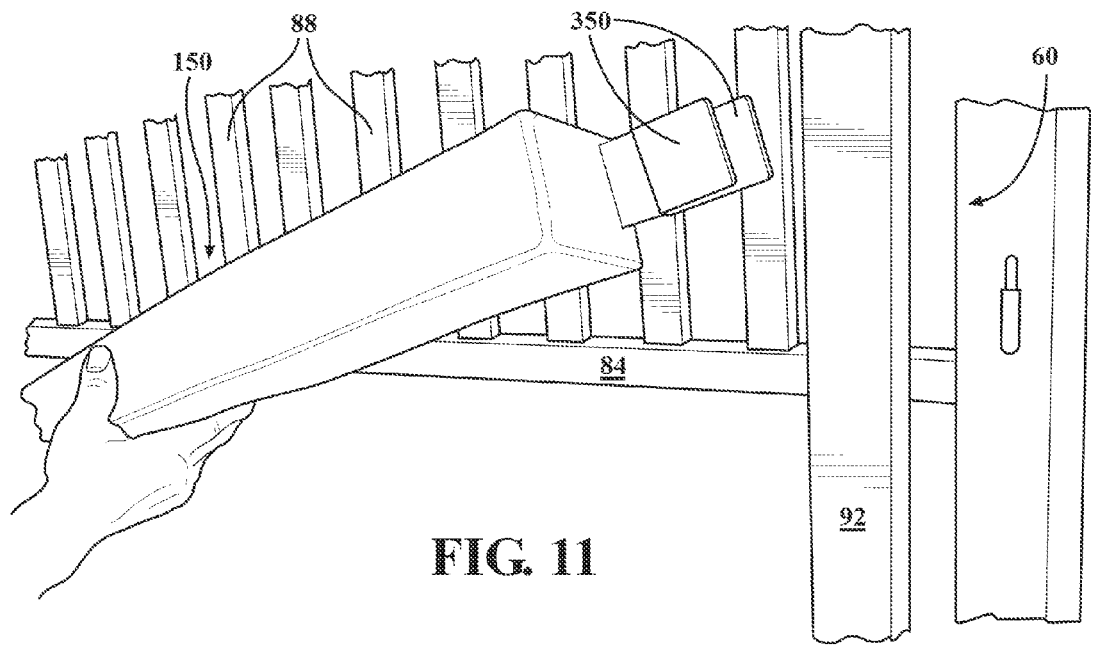
FIG. 11 is a partial perspective view showing the mounting of a breastplate in the forward portion of stall.
Figures 12A, 12B:
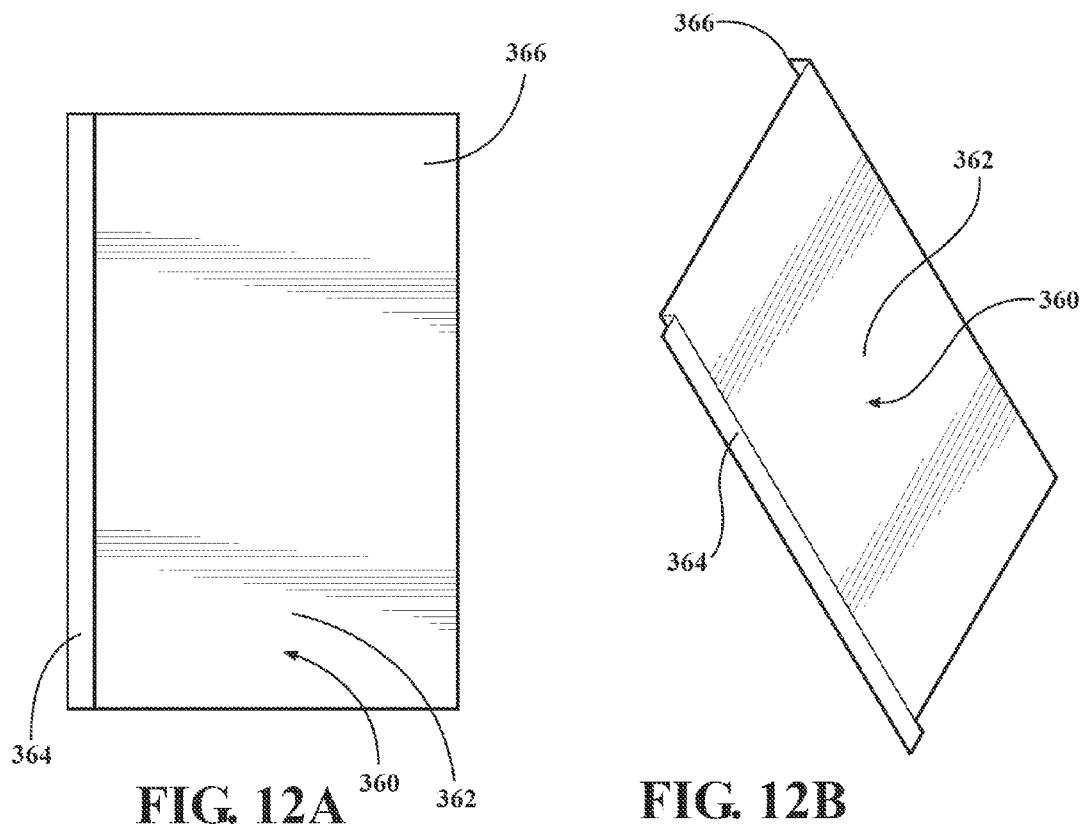
FIG. 12A is an elevational view of the feed tray.
FIG. 12B is a perspective view of the feed tray shown in FIG. 12A.
Figure 13:
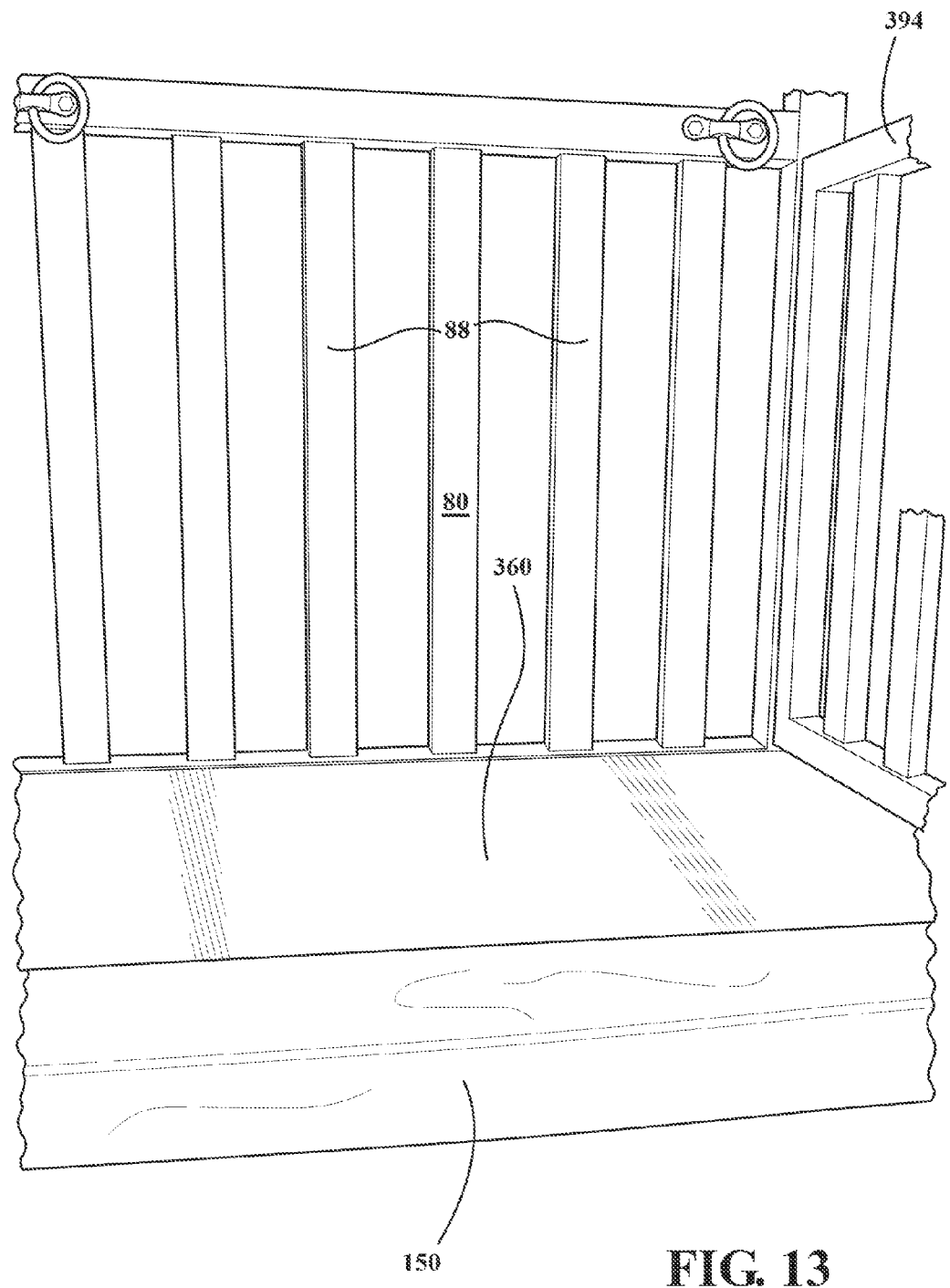
FIG. 13 is a partial perspective view showing the mounting of the breastplate and feed tray in the front end of a stall.
Figure 14:
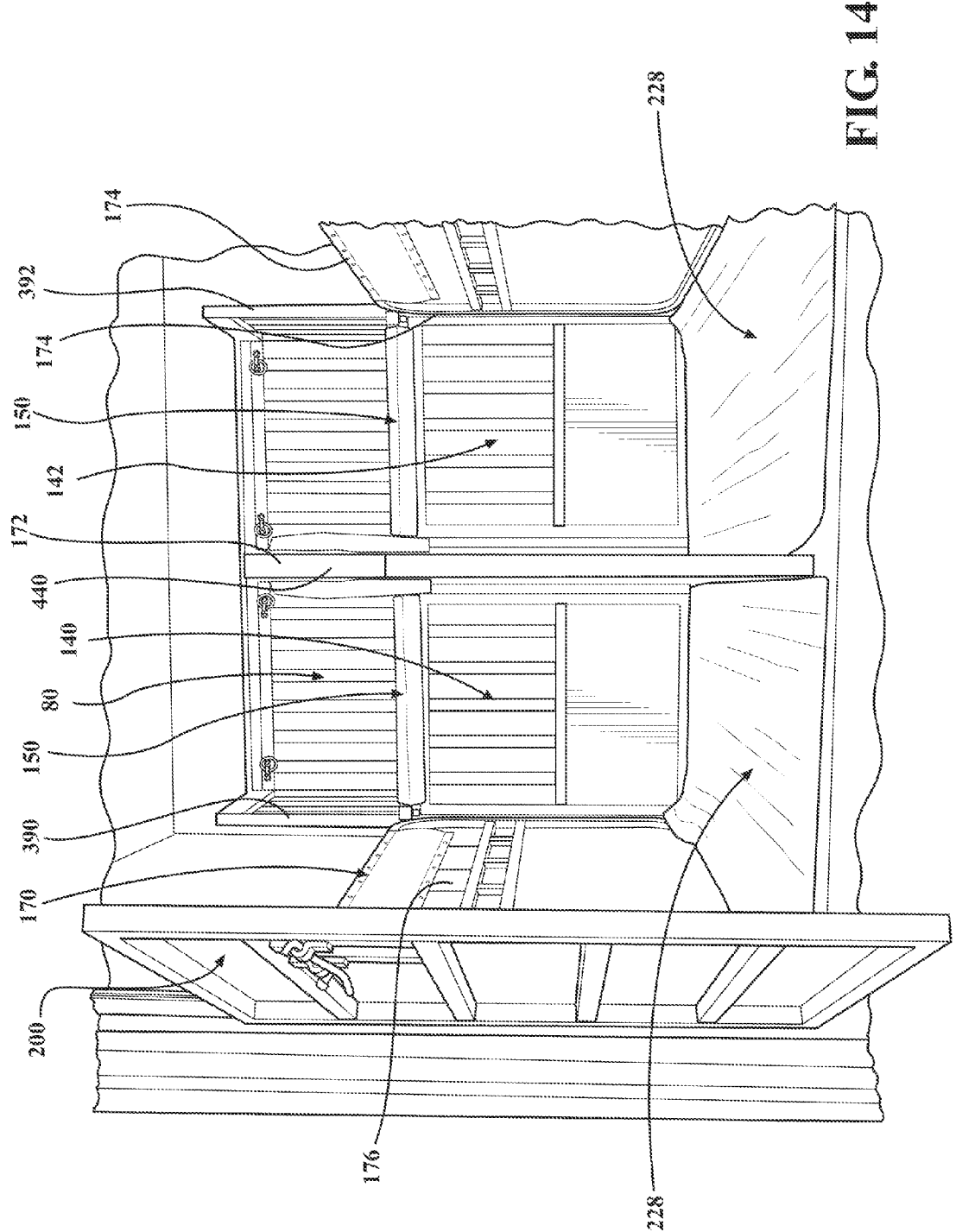
FIG. 14 is a rear elevational view of the conversion kit mounted in the trailer with the rear stall gates and the trailer ramp in an open position.

Two breastplates 150, FIG. 11, each generally in a form of a metal tubular member, are removably attached to outer rear stanchions 92 and to an immediate rear stanchion 92 by means of notches 350 on the ends of each breastplate 150. The notches 350 engage opposite sides of the stanchions 92 and seat one end of each breastplate 150 on a flange 352 welded to the stanchion 90 as shown in FIG. 10. The breastplates 150 define a forward barrier for a horse mounted in either stall 140 or 142.

It should also be noted that the breastplates 150 are designed to provide a forward limit for horse's chest, with the horse's head freely moveable between the stanchions 92 or protection of the horse's chest, the breastplates 150 can carry a cushion on the side facing the horse.

Referring now to FIGS. 3, 12A, 12B, and 13, there is illustrated two removable panels or trays 360 which are mounted to and between the breast plates 150 and the front wall 80. Each tray 360 has a generally horizontal, enlarged plate like surface 362 with one step up and outward flange 364 extending along one side edge and a depending linear flange 366 extending from the opposite edge. The flanges 364 and 366 engage the breastplate 150 and the lower bar 84 of the front wall 80 to removably mount each tray 360 between the stanchion 60 and 92, the breastplates 150 and the front wall 80 in a location to act as a feed tray.

For each stall, lower manger doors or panels 130 and 132, FIGS. 3 and 10, are mounted to the stanchions 92 generally below the breastplates 150. The panels 130 and 132 may optionally be pivotably attached by means of hinge elements 370 and 372 to the stanchions 92, and provided with a suitable latch, such as a slam latch, to an adjacent stanchion 92.

As shown in FIG. 3, at least two and, by example, three upper panels 390, including a pair of outer located panels 390 and 392 and a center panel 394, are mounted above the breast bars 150 and extend between the outer pairs of stanchions 60 and 92 and from the intermediate stanchion 92 to the front wall 80. Each of the panels 390, 392, and 394 are formed of an outer aluminum frame with vertically extending ribs. The upper panels 390 and 392 may be releasibly mounted in a stationary position to the stanchions 60, 92 and the front wall 80 by means of the J-pins 74 described above. The outer panel 392 may also be hinged to act as a door to allow access to the sides of the feed trays 360.

Figure 16:
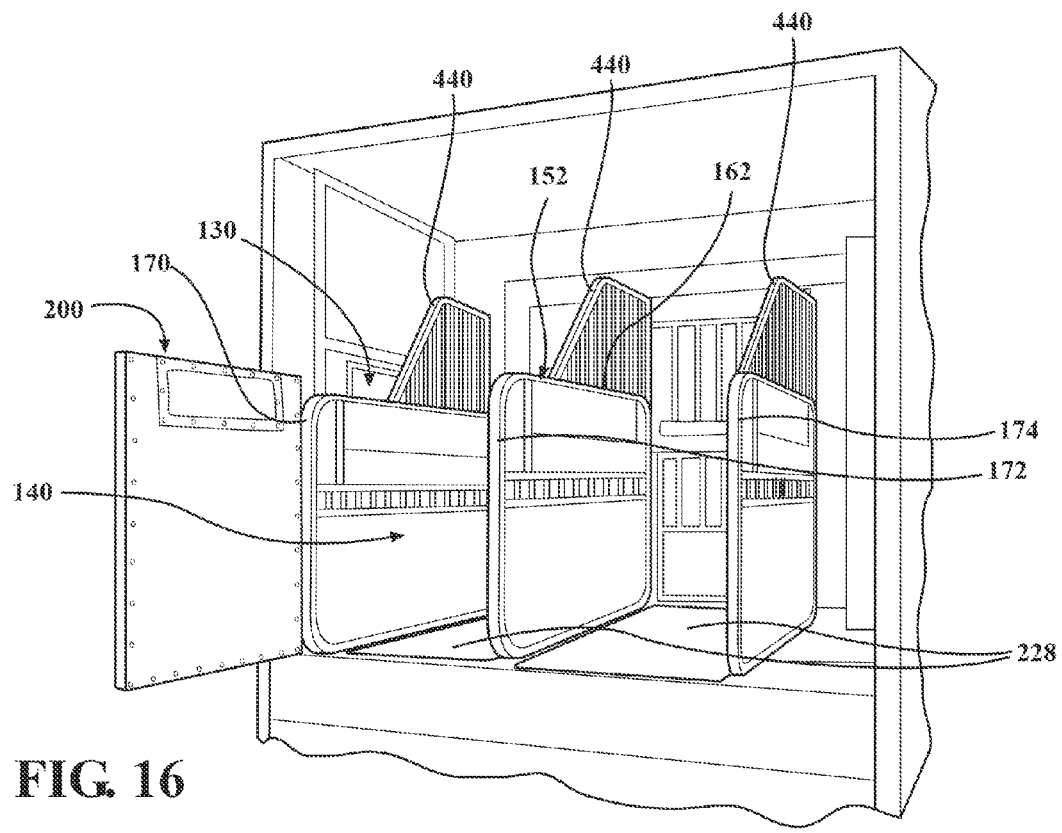
FIG. 16 is rear perspective view, similar to FIG. 14, but with one of the rear gates shown in an open position.

As shown in FIG. 16, by way of example, the conversion kit is configured for forming two adjacent stalls 140 and 142. It would be understood that the conversion kit could also be configured for forming a single stall 140 or 142.

Dividers 170, 172 and 174 can be formed of an aluminum frame having a tubular outer frame structure which surrounds a plurality of horizontally extending spaced tubular members joined to the outer frame and a plurality of vertically extending tubular members extending between the horizontal members and one leg of the frame. The lower portions of each panel or divider 170, 172, and 174 may be covered with wood, plastic coated wood, or other composite materials.

As shown in FIG. 16, a pad 162 may be mounted on the upper inner portions of the outer panels or dividers 170 and 174, and both upper sides of the intermediate or center panel 172 to provide a cushion to protect the horse.

For the two stall 140, 142 conversion kit shown in FIG. 4, three divider, such as outer divider 170, central divider 172 and opposite outer divider 174 are horizontally spaced apart and attached at forward ends to one of the stanchions 92. Each divider 170, 172, and 174 may be constructed of a solid material, such as plastic coated wood or, more desirably, aluminum for a lightweight construction. The lightweight feature is advantageous since the dividers 170, 172 and 174 must be easily moveable into and out of the storage compartment 34.

Each divider 170, 172, and 174 may be formed of a tubular frame 176 which may optionally support an interior panel 178, formed of plastic coated wood, aluminum, etc.

Figure 15:
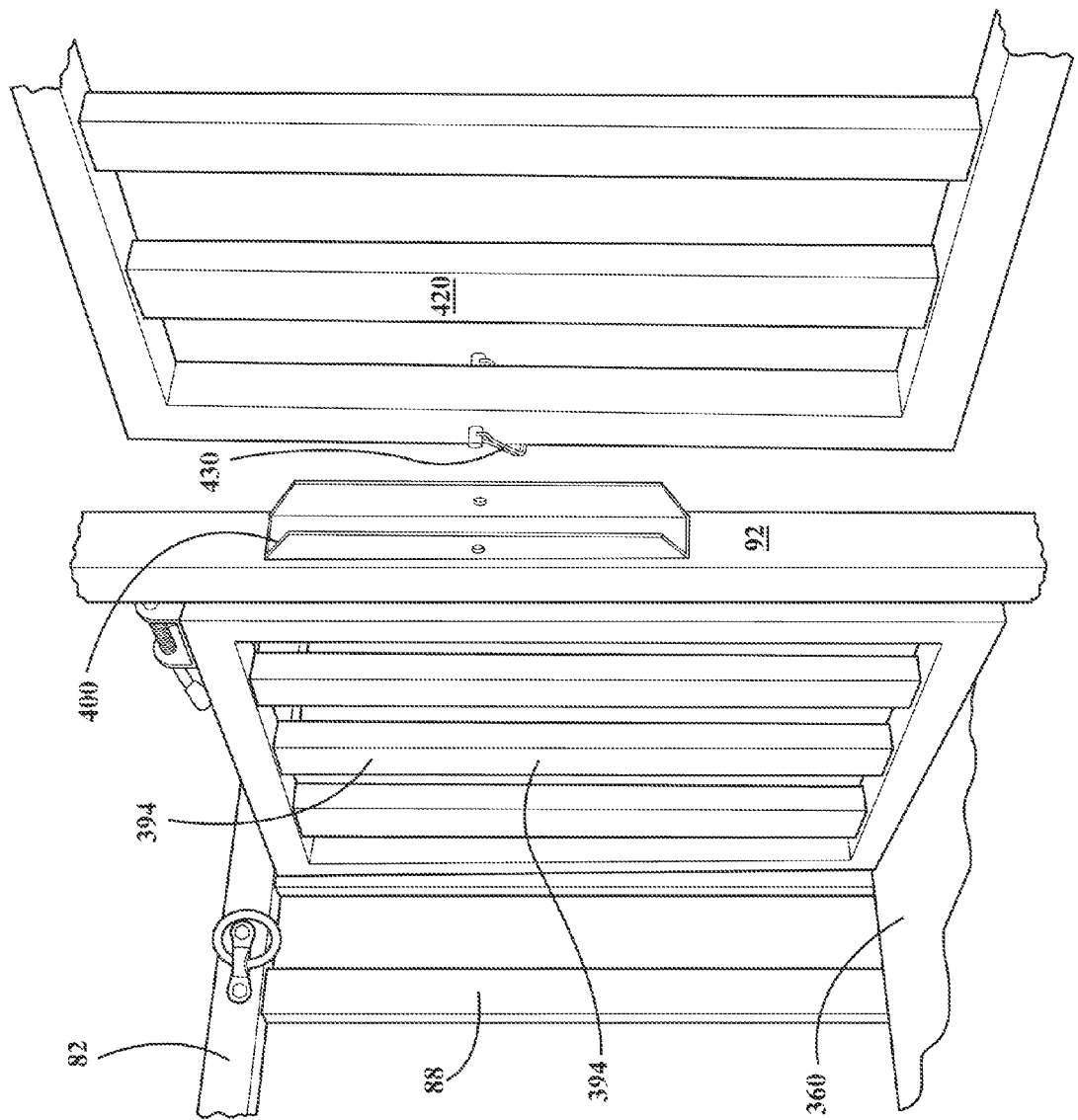
FIG. 15 is a perspective view showing the engagement of a stall divider with the front wall.

As shown in FIG. 15, at least one or a pair of spaced channel members 400 are fastened or otherwise joined, such as by welding, to each of the rear stanchions 92. The channels 400 open to the rear of the storage compartment 34 and are sized to slideably and releasibly receive the front most frame leg of the dividers 170, 172, and 174 as well as an upper divider brace 420 affixed by fasteners or welding to one upper end of each 170, 172, and 174.

Releasable lynch pins 430 are engageable in aligned apertures in the channels 400 and the adjacent end leg of the dividers 172, 174 and 176 to releasibly secure each dividers 172, 174 and 176 to the rear stanchions 92.

Figure 6A:
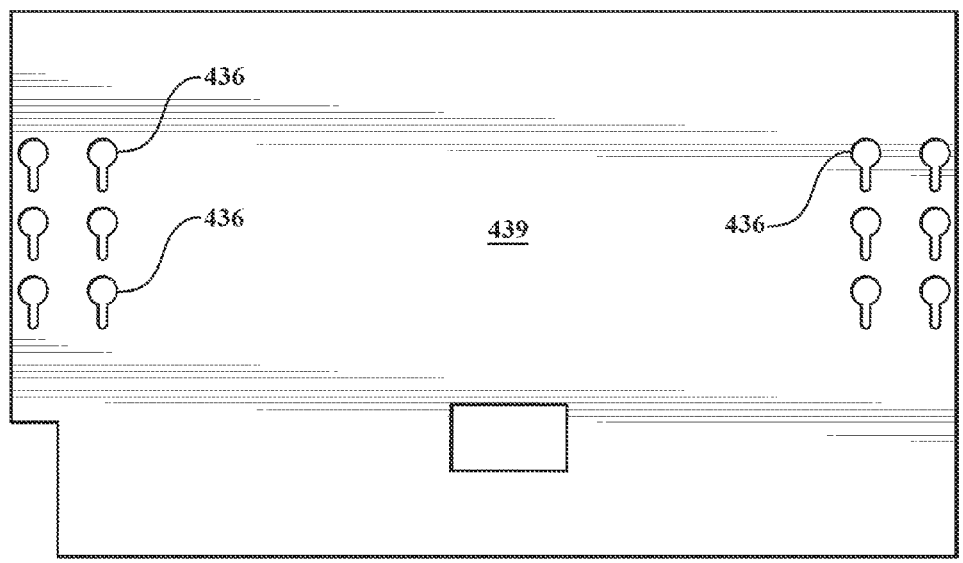
FIGS. 6A and 6B are plan views of floor plates.
Figure 6B:
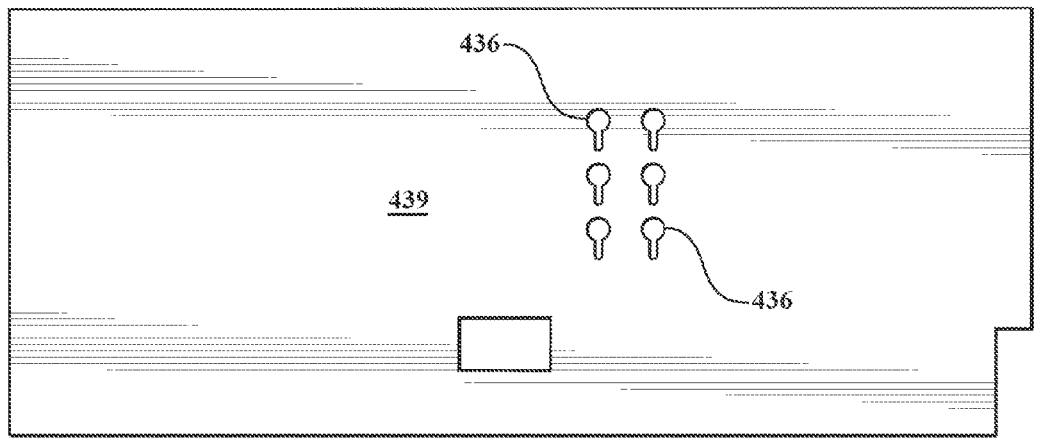

One or more rigid plates, such as diamond plates 438 and 439 shown in FIGS. 6A and 6B are fixed by suitable fasteners to the floor 66 of the storage compartment 34. The plates 438 and 439 serve to protect the floor 66 of the trailer 30 and to strengthen the conversion kit 10. Dovetail shaped apertures 436 are formed in spaced aligned rows in the plates 438 and 439, generally at the position where the dividers 170, 172, and 174 pasts over the plates 138 and 139.

Figure 7:
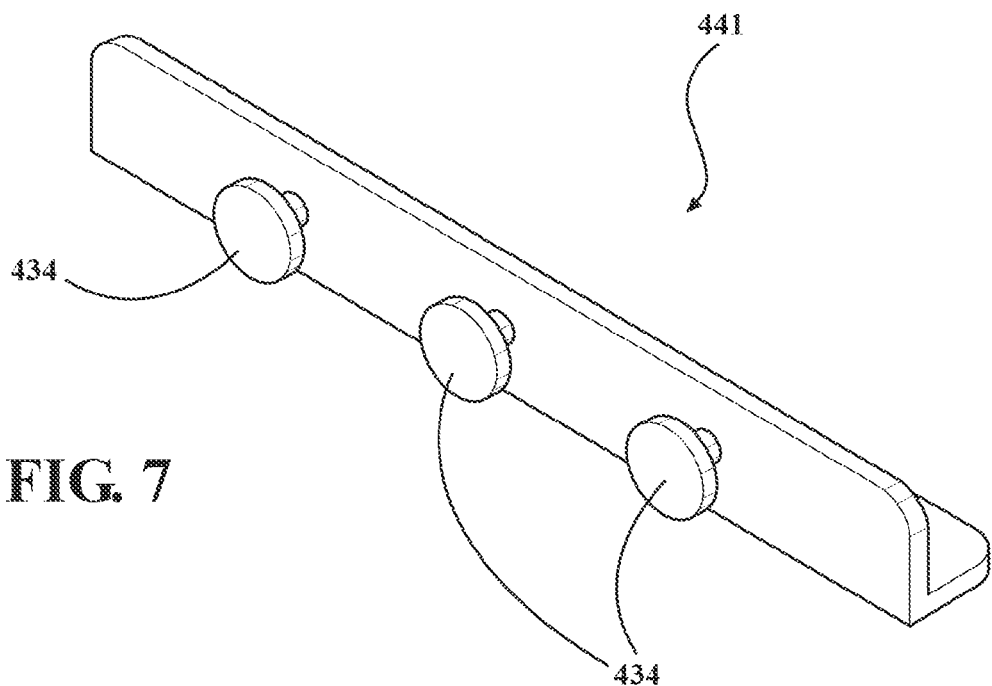
FIG. 7 is a perspective view of a stall divider locator support mounted in the plates depicted in FIGS. 6A and 6B.
Figure 8:
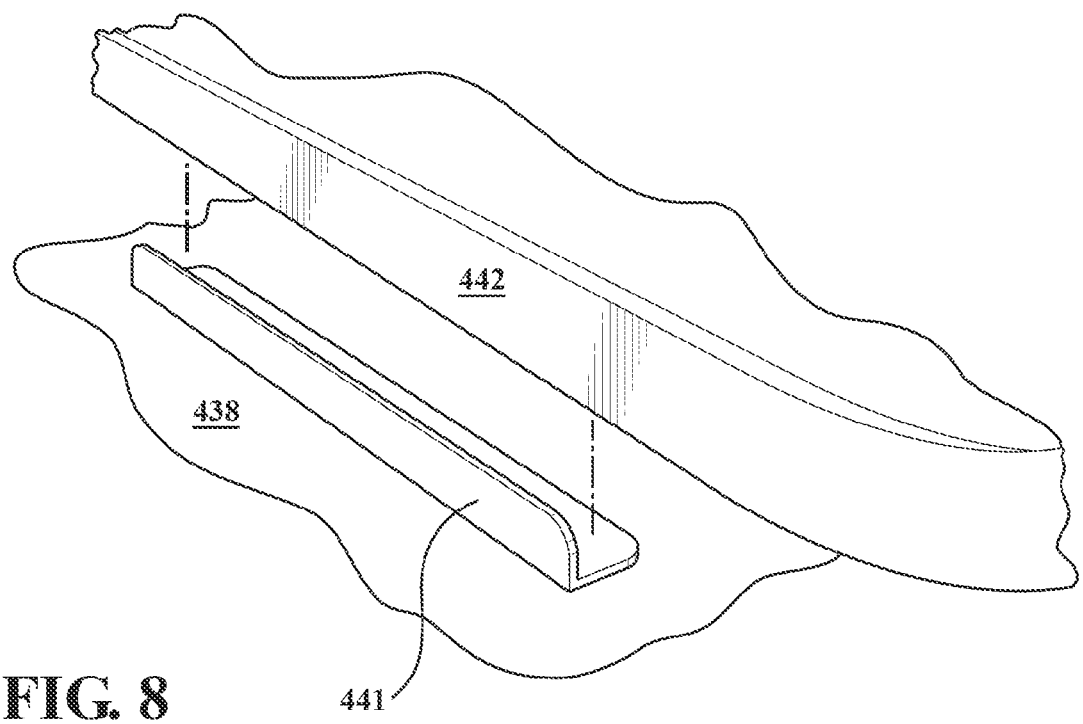
FIG. 8 is an exploded, perspective view showing the mounting of a stall divider in the locator support shown in FIG. 7.

As shown in FIG. 7, one or more L-shaped channels 441 have a plurality of enlarged engagement members 434, each with an enlarged head spaced from and connected to one of the legs of the L-shaped channel 441 by a smaller diameter stem. The enlarged head of each attachment member 438 is designed to fit within the enlarged end of a dovetail opening 436. With three attachment members 438 shown by example on each channel 441, the enlarged heads of the attachment members 438 can be slid into the large diameter end of the aligned group of dovetail apertures 436. The L-shaped channel 441 is then slid in one direction to bring the narrow diameter stem of each attachment member 438 into engagement with the smaller diameter slot-end shaped end of each dovetail aperture 436. This locates the channel 441 in position on the plate 438 or 439. The channels 440 receive a bottom leg 442 of one of the dividers 170, 172, and 174 to locate the dividers 170, 172, and 174 in a stationary position within the storage compartment 34; while allowing easily removal of the dividers 170, 172, and 174 from the storage compartment 34 to reconfigure the storage compartment 34 for other non-horse transport uses.

As described above, each divider 170, 172, and 174 includes a divider brace 440 positioned above an upper rail of each divider 170, 172, and 174. The divider braces 440 have an irregular shape with a larger height first end which extends from the rear stanchions 92 to a smaller height opposite end near the rear opening of each stall 140 or 142. The divider braces 440, which can be separate from the dividers 170, 172, and 174, or integrally formed as part of each divider 170, 172, and 174, provide separation of the horses in each stall 140 and 142.

Figure 19:
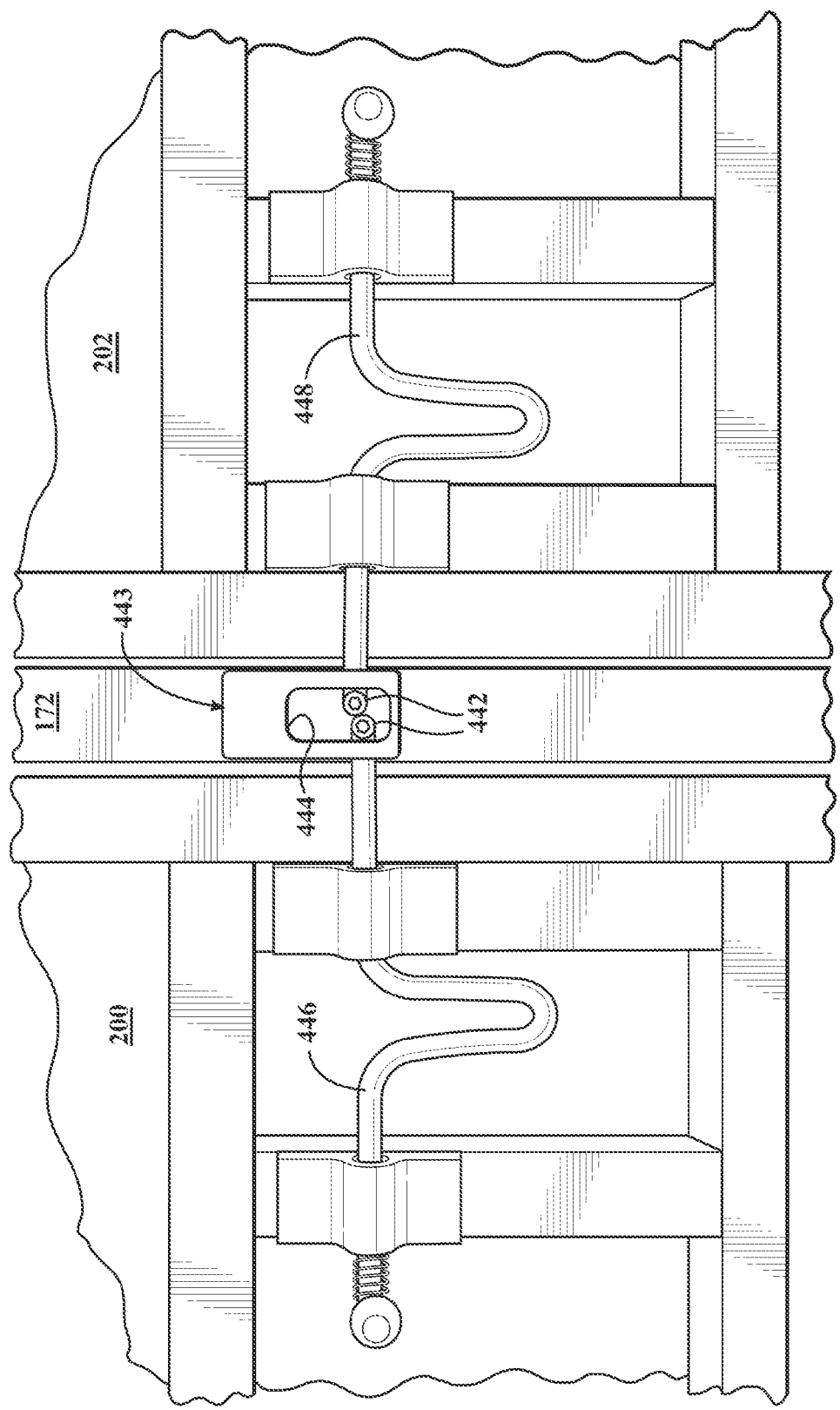
FIG. 19 is an enlarged, elevational view of the rear door lock mechanism.

In the two stall 140 and 142 version of the conversion kit, two gates 200 and 201, shown in FIGS. 1A, 4, and 19, are provided for closing off the rearmost ends of the stalls 140 and 142. It should be noted that the stalls 140 and 142, which may have equal or unequal widths, generally combine to form an overall width less than the width of the storage compartment 34 in the trailer 30. This forms a passageway between the divider 174 and the adjacent sidewall 37 of the storage compartment 34. This passageway allows access for the user along the length of the stall 142 and through a side door typically provided in the sidewall 37 of the storage compartment 34, to the forward portion of the storage compartment 34 and the front wall 80 for access to the bathroom, the door to the interior passenger compartment, or the upper manger door 192 of one feed tray 360.

It will be understood that one or both of the stalls 140 and 142 maybe made wider so as to take up all of the width of the storage compartment 34. Alternately, the two stalls 140 and 142 may have the width shown in FIG. 18, but one gate 202 has a larger width so as to also close and open one end of the passageway. In this instance, the gate 202 would be hinged to the sidewall of the storage compartment rather than to the end of the divider 174.

The gates 200 and 202 are hinged to the rear end frame legs of the dividers 170 and 174. The innermost edges of the gates 200 and 202 carry cam members which releasibly engage a slot 444 carried on a bracket 443, welded to the rear end of the central divider 172. When the gates 200 and 202 are in the closed position shown in FIG. 19, the cam members 442 extend outward through the slot 444 to releasibly lock the gates 200 and 202 in a closed position, closing the ends of the stalls 140 and 142. Rotatable spring biased lock members 446 and 448 are carried in brackets affixed to each gate 200 and 202. The lock members 446 and 448 may be rotated and slid sideways to rotate the cam members 442 into and out of engagement with the slot 446 to lock and unlock the gates 200 and 202.

An inner surface of each gate 200 and 202, shown in FIG. 16, may be provided with a pad or cushion to protect the horse as well as the inner metal panel forming the structure of each gate 200 and 202.

A protective assembly maybe provided over the floor 66 of the storage compartment 34 within each stall 140 and 142. The protective assembly can include, for example, a plastic sheet laid over the floor 66 within each stall 140 and 142. A moveable tray, sized to the interior dimensions of the stalls 140 and 142 is then disposed over the plastic sheet within the interior of the dividers 170 and 172 and the panel 130 for the stall 140 and the corresponding members of the stall 142. A rubber or synthetic mat 228 is then mounted within the tray in each stall 140 and 142.

The floor protective assemblies can be moved into and out of the stalls 140 and 142 during the installation or removal process of the conversion kit as well as being removeable at any time for cleaning.

Figure 17:
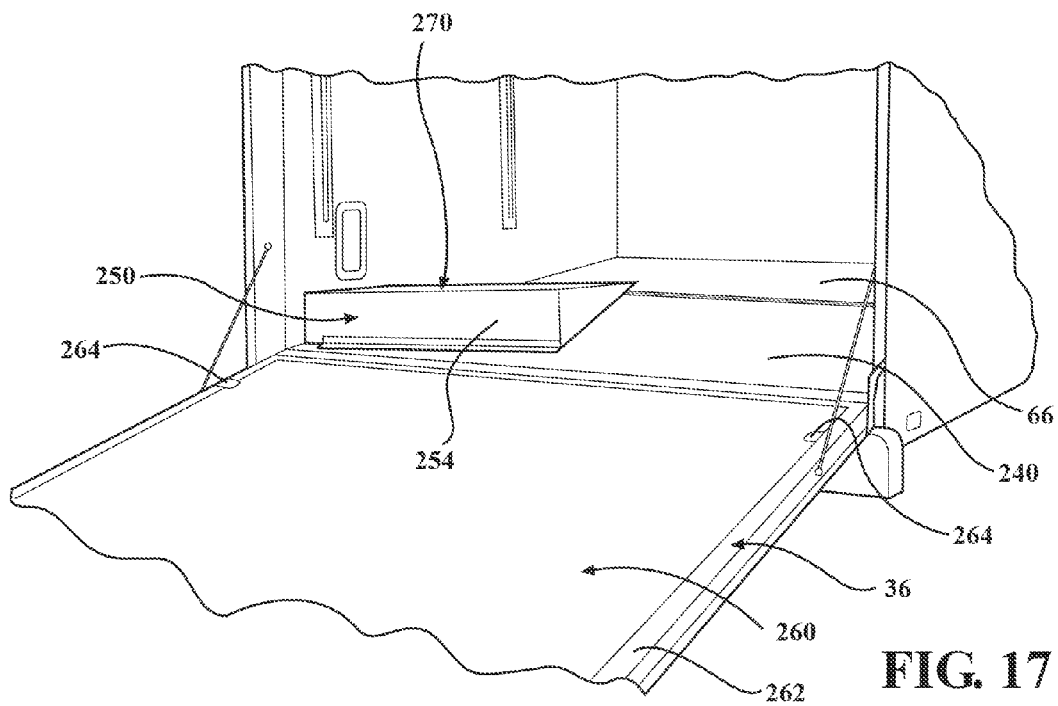
FIG. 17 is an enlarged, perspective view showing the installation of the floor wedges in the trailer.
Figure 18:
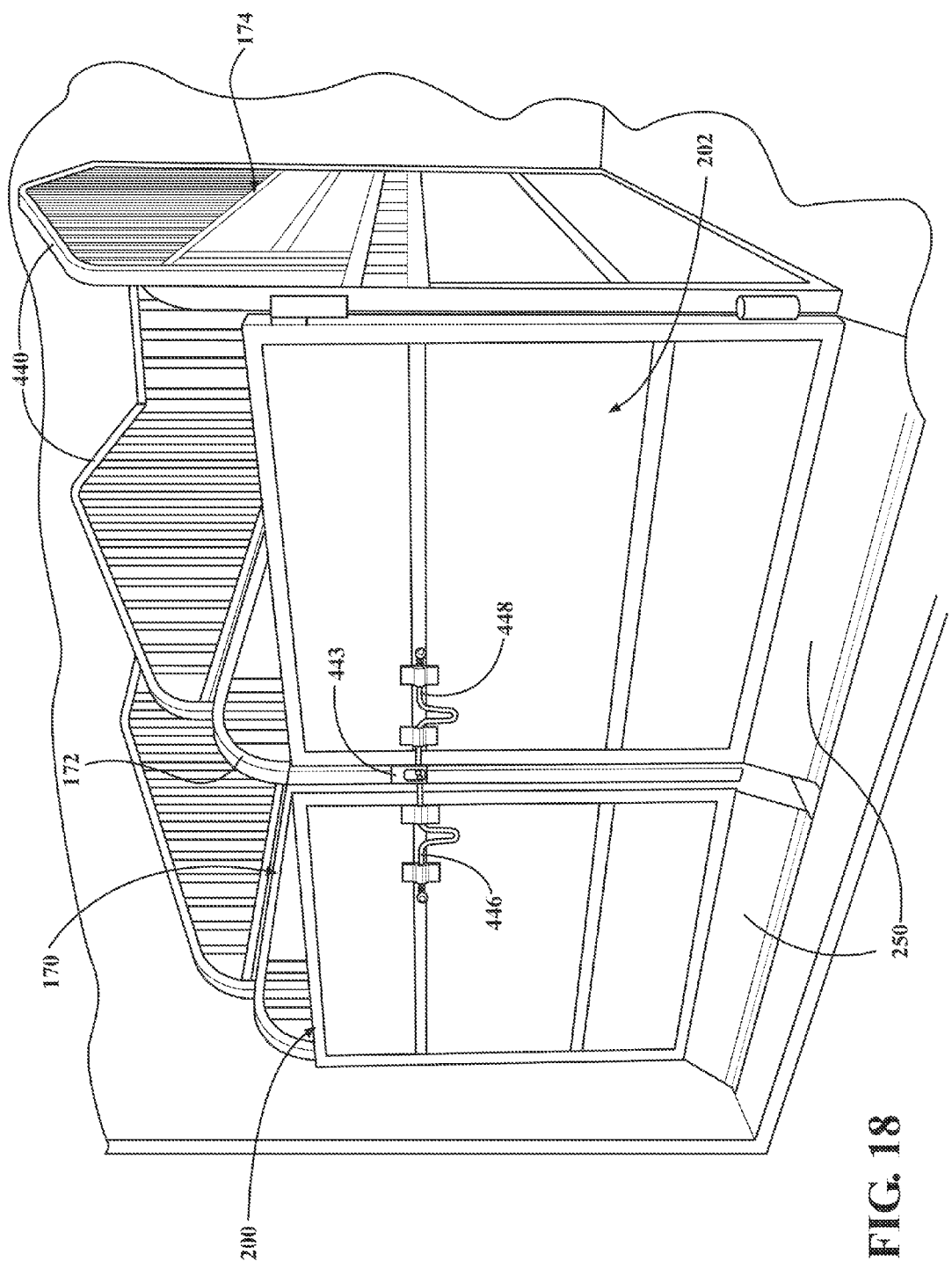
FIG. 18 is an enlarged, perspective view of the rear stall gates depicted in a closed position.

As shown in FIG. 17, certain toy box or toy hauler trailers 30 have an inclined surface 240 between the rear edge of the floor 66 and the pivotal ramp 36. This surface 240 provides easy movement of a wheeled vehicle into and out of the storage compartment 34.

However, it is desirable to have a substantially continuous horizontal surface for all four legs of a horse. Thus, for those toy haulers which have the inclined surface 240, a wedge or, for example, a pair of wedges 250 is provided. Each wedge 250, only one of which is shown in FIG. 17, has a frame with flat top surface 252 and a rear surface 254. The wedges 250 are laid over the inclined surface 240 in the storage compartment 34. The top surface 252 of each wedge 250 forms a horizontal continuation of the floor 66 of the storage compartment 34.

In addition, each wedge 250 is held in a stationary position within the storage compartment 34 by fasteners into the floor 66 of the storage compartment 34.

A protective mat 270 may also be attached to and cover the rear surface 254 of the wedges 250 as well as to provide a smooth continuous transition between the ramp 36 and the top surface 252 of the wedges 250.

Although the trailer 30 maybe provided with a protective surface on the interior of the ramp 36 to protect the ramp from the wheels of the vehicles moved into and out of the storage compartment 34, by way of example only, an additional ramp protection surface assembly 260 is shown in FIG. 17. The assembly 260 includes a peripheral frame 262 which fits within spaced flanges 264 mounted to the periphery of the ramp 36. A pad or a multilayer assembly of pads 264 sized to cover the entire surface of the ramp 36 fits within the frame 262.

In installing the horse stall conversion kit in an empty storage compartment 34 of toy hauler 30, the wedges 250 may be installed first. Next, the frame 310 and stanchions 60,92 are stationarily mounted on frame 310 on the floor 66 of the storage compartment 34. Next, breast plates 150, optional trays 360, optional lower manger panels or doors 130, and the upper stall dividers 392 and 394 are mounted between the stanchions 60, 92 and/or the front wall 80. The dividers 170, 172, and 174 are then connected at front ends to the stanchions 92.

The floor protective assemblies including the mats 228 are then mounted over the floor 66 and top surface 252 of the wedges 250 within each stall 140 and 142. The rear gates 200 and 202 are then attached to the hinges 216 and 218.

The ramp protective assembly 260 maybe secured to the inner surface of the ramp 36. It should be noted that the ramp protective assembly 260 may be attached to the ramp 36 as the first step in the conversion process or at any time in the installation process or it typically can remain on the ramp 36 after the kit is removed from the compartment 34.

Various optional features may also be provided in the horse stall conversion kit for increased protection of the horses and added flexibility in use of the horse stall conversion kit.

As shown in FIG. 20, one or more commercially available saddle mount 290 can be fixed to interior surface of either or both of the pair of lower manger panels 130 for supporting a saddle(s) 292 under the trays 360. In the case of pivotal mounting of the panels 130 to the stanchions 92, the saddle mount 290 projects outward from the panel 130 for easy access to mount or remove a saddle from the saddle mount 290.

Trailer sidewall protection is provided by mounting one of the dividers, such as divider 170, adjacent the outer surface of the sidewall 33 on the exterior of the storage compartment 34. A pair of clips are fixed to the exterior of the sidewall 33 and are spaced apart a distance to receive the divider 170 therebetween in an upright position. A tether or strap with snaps at opposite ends is releasibly attached through an eyebolt or a U-bolt to the clips and extends between the pair of clips across the exterior surface of the divider 170. This arrangement allows the horse to be tethered to the strap while protecting the exterior surface of the sidewall 33 of the storage compartment 34 from damage should the horse kick or otherwise contact the sidewall 35.

Finally, referring again to FIG. 2, a step rail 310 is removably attached to the pull down steps 312 provided with the toy box 30. A slide member 314 in the form of a tube, for example, is mounted within brackets underneath the lowermost step 312. A tubular member 316 is fixed to the outer end of the slide member 314 and it is releasibly attachable to provide means of suitable mounts to mating mounts affixed to the exterior surface of the sidewall 35 of the storage compartment 34. The tubular member 316, which may also be provided on both sides of the steps 312, provides safety for user when ingressing or egressing from the storage compartment 34.

Although the above description and drawings describe and show a two stall 140 and 142 trailer conversion kit, it will be understood that the conversion kit can be provided in a basic form for a single stall 140. In this form, the conversion kit includes the dividers 170 and 172, stanchions 60 and 92, the floor frame 310, one breastplate 150, the front wall 80, two upper manger panels 390 and 392, and the rear gate 200. This configuration of the conversion kit will accommodate a single horse along one side of the storage compartment 34

Optional elements can be added to this basic conversion kit, such as, the feed tray 360 and an optional lower manger door or panel 130. It will be understood that these elements are optional and maybe provided singly or in various combinations as an addition to the basic conversion kit described above.

Similarly, the conversion kit can be constructed as a two basic stall conversion kit. In a basic configuration, the two-stall conversion kit will include the three dividers 170, 172, and 174, the frame 310, the stanchions 60,92, the upper divider braces 440, two breastplates 150, the front wall 80, upper panels 390, 392, 394 and two rear gates 200 and 202. The two feed trays 360 as well as the lower manger doors or panels 130 are options which can be added to the basic two-stall conversion kit described above.

All of the conversion kits can have the option of the added floor plates 438 and/or 439 along with the divider locating channels 441.

In another aspect, the above-described components of the conversion kit may be more permanently installed in the storage compartment 34 of a trailer 30. In a basic configuration, the trailer 30 includes a plurality of stanchions mounted on the trailer floor, a pair of dividers affixed at one end to two of the stanchions, a breastplate spanning the two stanchions at one end of the dividers, a forward wall spanning two other stanchions, upper panels affixed between the stanchions forward of the breastplate, and a rear located openable gate spanning the rear end of the two dividers.

In this aspect, while the individual components may be releasibly affixed to each other, in this disclosed more permanent arrangement, the individual components can be secured in affixed position relative to each other by suitable fasteners, such as screws, nuts and bolts, rivets, etc.

What is claimed is:

1. A conversion kit for an enclosed cargo storage compartment of a trailer defined by a floor, sidewalls, a front wall, an openable rear wall, and a ceiling, the conversion kit comprising:
a plurality of stanchions removably mounted to the floor of the trailer;
at least two dividers releasibly affixed to the stanchions;
a breastplate removably mounted between the stanchions and forming, in conjunction with the dividers, a stall open through the rear wall of the trailer;
a front wall spanning two of the stanchions;
upper panels coupled to the front wall and located between the breastplate and the front wall; and
an openable gate spanning one end of the at least two dividers to close the stall.

2. The conversion kit of claim 1 further comprising:
a frame removably fixed to the floor;
a bore in the frame; and
a releasable lock cooperating between one stanchion and the bore in the frame for removably affixing the one stanchion to the trailer floor.

3. The conversion kit of claim 1 further comprising:
a tray removably mounted between the breastplate and the front wall at one end of the stall.

4. The conversion kit of claim 1 further comprising:
a lower manger panel removably coupled between the stanchions and located at one end of the dividers to span at least two of the dividers.

5. The conversion kit of claim 4 wherein:
the lower manger panel is pivotally coupled to one of the stanchions to enable the lower manger panel to be pivoted between a first position extending across at least one of the dividers and a second position wherein one end of the lower manger panel is spaced from the dividers.

6. The conversion kit of claim 4 further comprising:
a saddle hanger fixed to the lower manger panel.

7. The conversion kit of claim 1 further comprising:
a divider brace carried on an upper portion of at least one of the dividers.

8. The conversion kit of claim 1 further comprising:
a protective mat fixed to an inner surface of the rear wall of the trailer, the rear wall of the trailer acting as a ramp to an open end of the at least one stall when the rear wall is pivoted to a downward extending position.

9. The conversion kit of claim 1 further comprising:
a wedge mounted on a rear inclined end of the floor, the wedge having an upper surface forming a continuous level upper surface with a remainder of the floor in the cargo area.

10. The conversion clip kit of claim 1 wherein:
the gate is pivotally coupled to a rear end of one of the two dividers, the gate pivotally movable between a closed position between the at least two dividers and an open position allowing access to the stall formed between the at least two dividers.

11. The conversion kit of claim 1 wherein:
at least one of the upper panels is pivotally mounted to one of the front wall and one stanchion.

12. The conversion kit of claim 1 further comprising:
a plate mountable on the floor of the storage compartment:
at least one aperture formed in the plate;
a divider support removably mountable to the plate through the aperture to support one of the dividers on the plate.

13. The conversion kit of claim 1 wherein:
the at least two divider panels include three divider panels; and further including:
two rear gates pivotally mounted adjacent one open end of two stalls formed by the spaced three dividers.

14. The conversion kit of claim 13 further comprising:
one of the three dividers removably mounted adjacent one of the side walls of the trailer; and
another one of the three dividers mounted in the cargo area of the trailer spaced from the opposed sidewall of the trailer to define a passageway between the another one divider and the opposed sidewall of the trailer.

15. A trailer having an enclosed cargo compartment defined by a floor, sidewalls, a front wall, and, a ceiling, the trailer comprising:
a plurality of stanchions removably mounted to the floor of the trailer;
at least two dividers releasibly affixed to the stanchions;
a breastplate removably mounted between the stanchions and forming, in conjunction with the dividers, a stall open through the rear wall of the trailer;
a front wall spanning two of the stanchions;
upper panels coupled to the front wall and located between the breastplate and the front wall; and
an openable gate spanning one end of the at least two dividers to close the stall.

16. The trailer of claim 15 further comprising:
a frame removably fixed to the floor;
a bore in the frame; and
a releasable lock cooperating between one stanchion and the bore in the frame for removably affixing the one stanchion to the trailer floor.

17. The trailer of claim 15 further comprising:
a tray removably mounted between the breastplate and the front wall at one end of the stall.

18. The trailer of claim 15 further comprising:
a lower manger panel removably coupled between the stanchions located at one end of the dividers to span at least two of the dividers.

19. The trailer of claim 18 further comprising:
the lower manger plane is pivotally coupled to one of the stanchions to enable the lower manger panel to be pivoted between a first position extending across at least one of the dividers and a second position wherein one end of the lower manger panel is spaced from the dividers.

20. The trailer of claim 15 further comprising:
a saddle hanger fixed to the lower manger panel.

21. The trailer of claim 15 further comprising:
a divider brace carried on an upper portion of at least one of the dividers.

22. The trailer of claim 15 further comprising:
a wedge mounted on a rear inclined end of the floor, the wedge having an upper surface forming a continuous level upper surface with a remainder of the floor in the cargo area.

23. The trailer of claim 15 wherein:
the at least two divider panels include three divider panels; and further including:
two rear gates pivotally mounted adjacent one open end of two stalls formed by the spaced three dividers.

\* \* \* \* \*